(12) United States Patent
Miettinen

(10) Patent No.: US 7,456,615 B2
(45) Date of Patent: Nov. 25, 2008

(54) CHARGING ARRANGEMENT FOR CAPACITOR MEANS

(75) Inventor: Erkki Miettinen, Helsinki (FI)

(73) Assignee: ABB Oy, Helsinki (FI)

( * ) Notice: Subject to any disclaimer, the term of this patent is extended or adjusted under 35 U.S.C. 154(b) by 525 days.

(21) Appl. No.: 11/346,730

(22) Filed: Feb. 3, 2006

(65) Prior Publication Data

US 2006/0176027 A1    Aug. 10, 2006

(30) Foreign Application Priority Data

Feb. 4, 2005    (FI) .................................. 20055052

(51) Int. Cl.
*H01M 10/46* (2006.01)

(52) U.S. Cl. .................................................. 320/166

(58) Field of Classification Search ................ 320/107, 320/141, 166, 167; 363/125
See application file for complete search history.

(56) References Cited

U.S. PATENT DOCUMENTS

| 4,238,723 | A | * | 12/1980 | Jenks ........................... 323/322 |
| 5,179,842 | A | | 1/1993 | Kanazawa | |

2005/0105312 A1 * 5/2005 Miettinen ................... 363/125

FOREIGN PATENT DOCUMENTS

| DE | 195 08 348 A1 | 9/1996 |
| FI | 20030632 | 10/2004 |
| JP | 1-308170 A | 12/1989 |

OTHER PUBLICATIONS

Finnish Search Report (with English translation of cited documents) dated Jan. 9, 2006.

* cited by examiner

*Primary Examiner*—Edward Tso
(74) *Attorney, Agent, or Firm*—Buchanan Ingersoll & Rooney PC

(57) ABSTRACT

A capacitor charging arrangement to be supplied by a voltage containing network cycles, and having a gate-controlled semiconductor switch ($T_{ch}$) arranged for charging the capacitor ($C_{aux}$) and generating a control signal of the gate-controlled semiconductor switch. The control signal is generated with a device that includes a clipper, a first integrator, a second integrator, a cycle indicator, a reset device, an adder, a restricting circuit, a trigger circuit, and an isolation transformer.

14 Claims, 3 Drawing Sheets

CHARGING ARRANGEMENT FOR CAPACITOR MEANS

This application is based on and claims priority to Finnish Application No. 20055052, filed on Feb. 4, 2005, the entire content of which is hereby incorporated by reference.

BACKGROUND OF THE INVENTION

Modern high-power frequency converters or corresponding devices require auxiliary voltage sources that have the power of hundreds of watts in order to take care e.g. of the auxiliary voltages of control logic, gate controls of power components, as well as the power supply of adjustable cooling blowers. Usually, these auxiliary voltage sources are implemented without any large, heavy, and expensive supply-frequency converters not least because a frequency converter has to operate also during random outages by means of energy stored in its direct voltage intermediate circuit and inertia of machines supplied by the frequency converter.

A conventional auxiliary voltage source is a unit consisting of a diode bridge rectifier, a direct voltage intermediate circuit capacitor and an inverter which, at a high frequency, supplies a transformer providing a galvanic decoupling. However, the use of such an auxiliary voltage source includes some problems, such as a large current pulse which occurs upon connection to the network, and the fact that the diode bridge of the auxiliary voltage source rectifies overvoltage peaks occurring in the supplying network to its intermediate circuit.

FIG. 1 shows an example of a prior art auxiliary voltage source. Referring to FIG. 1, when an auxiliary intermediate circuit capacitor $C_{pa}$ becomes charged upon being connected to the network, due to the influence of a diode bridge 100 a large current pulse is consequently generated, which has to be restricted somehow in order to prevent safety fuse blowout. A time-rate of change of voltage caused by a mechanical connecting device may easily be several thousands of volts per microsecond, in which case an auxiliary intermediate circuit capacitor $C_{pa}$ having a capacitance of a few microfarads even at its minimum easily tends to cause a current peak of several thousands of amperes from a supplying rigid network (infinite bus). In the connection of FIG. 1, current is restricted by means of a charging resistance $R_{pa}$ connected in series with the intermediate circuit capacitor $C_{pa}$ and short-circuited by a switch $S_{pa}$ after the voltage of the intermediate circuit capacitor $C_{pa}$ has risen sufficiently close to its nominal value. However, the charging resistance is a large, space-consuming component, and in a fault situation, when overheated, it may cause a fire or other danger.

FIG. 2 shows an example of a voltage of a network supplying a high-power network inverter as a function of time. It can be seen in FIG. 2 that the high-power network inverter causes frequently occurring overvoltage peaks 200 in the network, which are rectified by the diode bridge of the auxiliary voltage source to its intermediate circuit. It has been noticed in measurements in practice that with a network voltage of 690 volts, a difference between positive overvoltage peaks and negative overvoltage peaks may be of the order of 2000 volts, so the overvoltage peaks are absolutely to be taken into account in the dimensioning of a diode rectifier 100 of the auxiliary voltage source and the subsequent energy storage components, as well as the switching semiconductors. This, in turn, may cause high additional costs, or lead to cumbersome solutions of connecting fast components in series. In addition, if the need for auxiliary power is so small that the energy contained in the peaks is not consumed as it is received by the auxiliary intermediate circuit, the voltage of the intermediate circuit increases until the inverter part of the auxiliary intermediate circuit has to be stopped in order to prevent the switch elements from being damaged due to the increasing switching losses.

BRIEF DESCRIPTION OF THE INVENTION

An object of the invention is to provide a charging arrangement for capacitor means so as to enable the aforementioned problems to be solved. The object of the invention is achieved by a charging arrangement for capacitor means which is characterized by what is disclosed in independent claim 1.

The invention is based on the idea of charging the capacitor means by means of a series of charging pulses, in which series each charging pulse is formed from a corresponding network cycle of a supplying voltage, the voltage of each charging pulse being higher than that of a previous charging pulse, until predetermined conditions are fulfilled, wherein the increase in the voltage of the charging pulses stops.

An advantage of the charging arrangement for capacitor means according to the invention is that the same charging apparatus may be used at several different voltage levels. A further advantage is that the charging arrangement according to the invention enables overvoltage peaks to be prevented from being conveyed to an intermediate circuit of the charging arrangement.

DETAILED DESCRIPTION OF THE INVENTION

Figure 1:
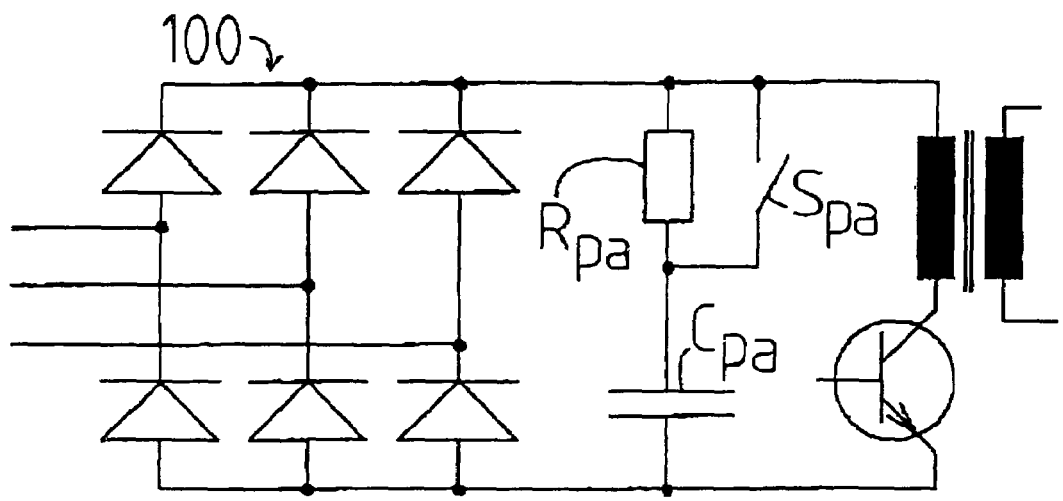
FIG. 1 shows a prior art auxiliary voltage source.
Figure 2:
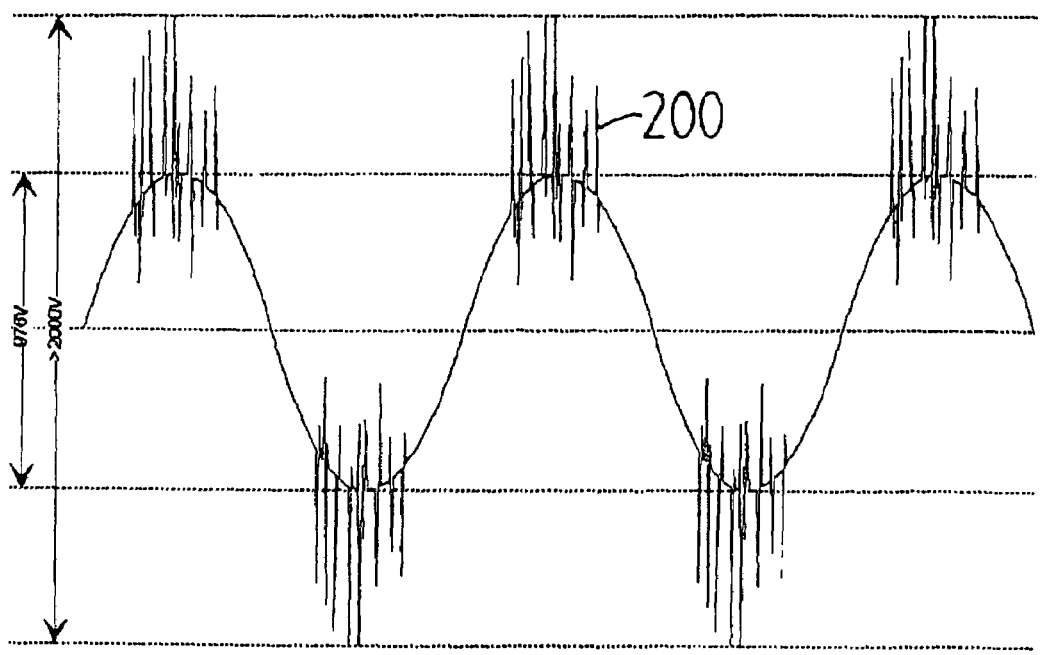
FIG. 2 shows a voltage of a network supplying a high-power network inverter as a function of time.
Figure 3:
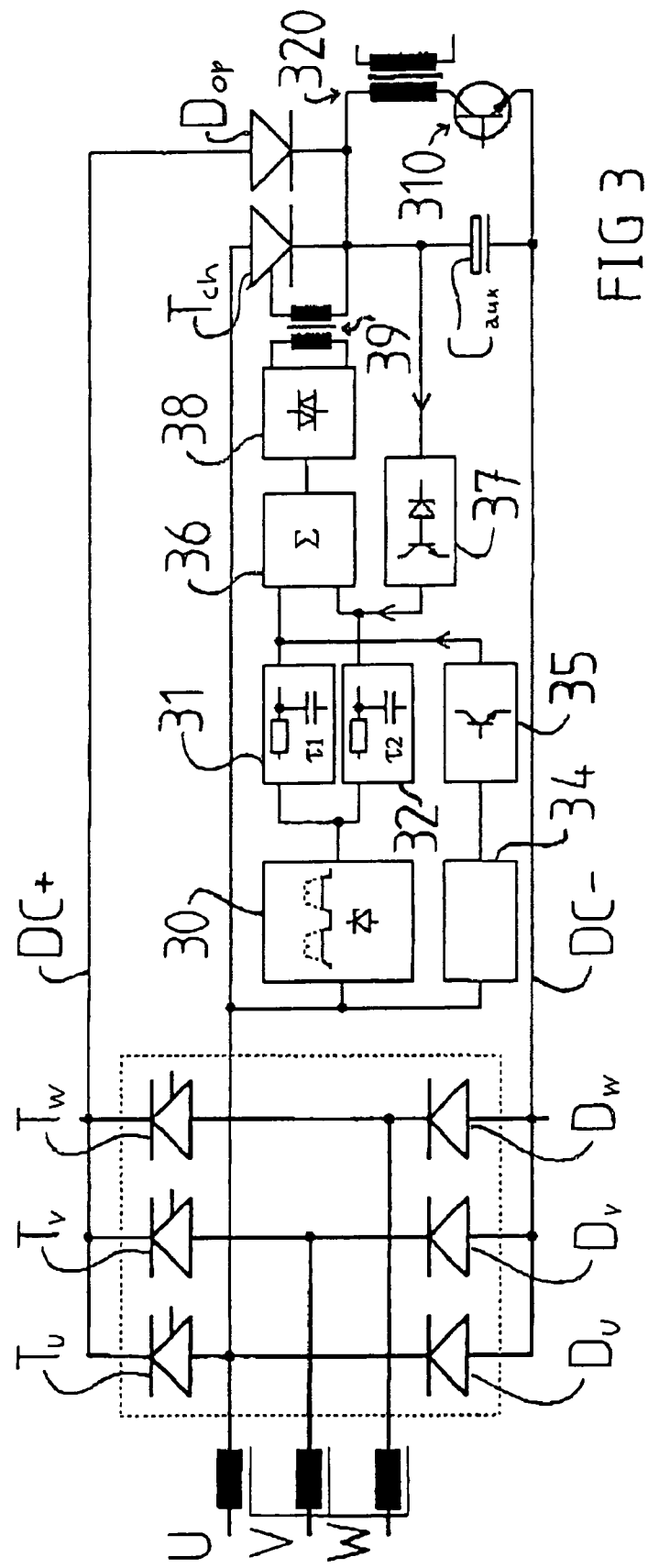
FIG. 3 shows a simplified connection diagram of a part of a frequency converter which includes a charging arrangement for capacitor means according to an embodiment of the invention.

FIG. 3 shows a simplified connection diagram of a part of a frequency converter which comprises a charging arrangement for capacitor means according to an embodiment of the invention. The frequency converter of FIG. 3 comprises a main circuit and an auxiliary voltage source. The main circuit includes main circuit capacitor means (not shown) connected between a positive busbar DC+ and a negative busbar DC−, and a semi-controlled rectifier bridge arranged for charging the capacitor means and including controllable semiconductor components $T_U$ to $T_W$. The auxiliary voltage source includes capacitor means $C_{aux}$ of the auxiliary voltage source and a charging arrangement for charging the capacitor means $C_{aux}$ of the auxiliary voltage source. The auxiliary voltage source is arranged to supply power for controlling e.g. the controllable semiconductor components $T_U$ to $T_W$ by means of the capacitor means $C_{aux}$ of the auxiliary voltage source.

In the frequency converter of FIG. 3, in the charging arrangement for capacitor means of the the auxiliary voltage source, prior art diode bridge rectifier 100 and charging resistance $R_{pa}$ have been replaced by a thyristor switch $T_{ch}$ which operates in a phase-clipping mode and which performs charging of the capacitor means $C_{aux}$ of the auxiliary voltage source such that no excessive charging current peak occurs. In addition, phase-clipping practically removes the influence of overvoltage peaks occurring in the network on the intermediate circuit voltage by restricting the intermediate circuit voltage to a given predetermined value. The inverter part of the auxiliary voltage source is supplied with this restricted voltage, until the voltage of the main intermediate circuit rises substantially to its nominal value, in which case the main circuit starts automatically to supply the auxiliary voltage circuit via a diode switch $D_{op}$. An anode of the diode switch $D_{op}$ is connected to the positive busbar DC+ while the cathode thereof is connected to the same point as the cathode of the charging thyristor $T_{ch}$, i.e. to the positive terminal of the capacitor means $C_{aux}$.

The charging arrangement of FIG. 3 enables the voltage of the intermediate circuit of the auxiliary voltage source to be automatically prevented from rising above an acceptable value in situations wherein the voltage of the main circuit is below a predetermined level. Situations wherein the voltage of the main circuit is below such predetermined level include frequency converter start-up situations and network outage situations. During normal use of a frequency converter, the capacitor means $C_{aux}$ of the auxiliary voltage source receive current via high-capacitance main circuit capacitor means, so that no detrimentally high voltage peaks can be conveyed to the auxiliary voltage source.

Before the semi-controlled rectifier bridge of the main circuit can be started, an auxiliary voltage is needed for the control the thyristors $T_U$ to $T_W$ of the bridge, which is produced by means of an auxiliary voltage source. In addition to the capacitor means $C_{aux}$ of the auxiliary voltage source, the auxiliary voltage source includes an inverter 310 and a galvanically isolating transformer 320.

In accordance with FIG. 3, phase U of the supplying network is connected to the auxiliary voltage source such that the anode of the charging thyristor $T_{ch}$ is connected directly to phase U. The common potential in the intermediate circuit of the auxiliary voltage source is the negative busbar DC−, via which the auxiliary voltage source taking its supply from phase U of the network closes in phases V and W of the supplying network via lower leg diodes $D_V$ and $D_W$ of the semi-controlled rectifier bridge of the main circuit. In FIG. 3, the negative terminal of the capacitor means $C_{aux}$ of the auxiliary voltage source is connected directly to the negative busbar DC−.

The auxiliary voltage source also includes a clipper 30, a first integrator 31, a second integrator 32, a cycle indicator 34, a reset device 35, an adder 36, a restricting circuit 37, a trigger circuit 38, and an isolation transformer 39. Phase U is directly connected to the clipper 30 and the cycle indicator 34.

A phase voltage acting against the negative busbar DC− is restricted by the clipper 30 to a wave form resembling a square wave and being of approximately 64 volts in amplitude so as to enable the dependency on network voltage to be omitted. The cycle indicator 34 provides information as to when the amplitude of the clipped wave form is below 64 volts, which, in turn, means that the network cycle acting over the charging thyristor $T_{ch}$ ends. The aforementioned limit of 64 V has been selected such that it is double the trigger level of 32 V of a diac included in the trigger circuit 38.

The clipped wave form in synchrony with the phase voltage supplies two integrators, an RC time constant $\tau_1$ of a first, upper integrator being chosen such that a peak value of an output voltage ramp of the first integrator 31 cannot become as high as the trigger level of 32 V of the trigger circuit during a network cycle. The first integrator 31 is reset by the reset device 35 at the end of each network cycle, so a ramp wave always starts at a zero level.

An RC time constant $\tau_2$ of a second, lower integrator 32 is much higher than $\tau_1$, so the voltage of the capacitor of the second integrator 32 increases slowly. The output voltages of the integrators 31 and 32 are added up by the adder 36, whereby a sawtooth wave is obtained whose amplitude increases with each network cycle, so that eventually the triggering level will be exceeded.

Figure 4:
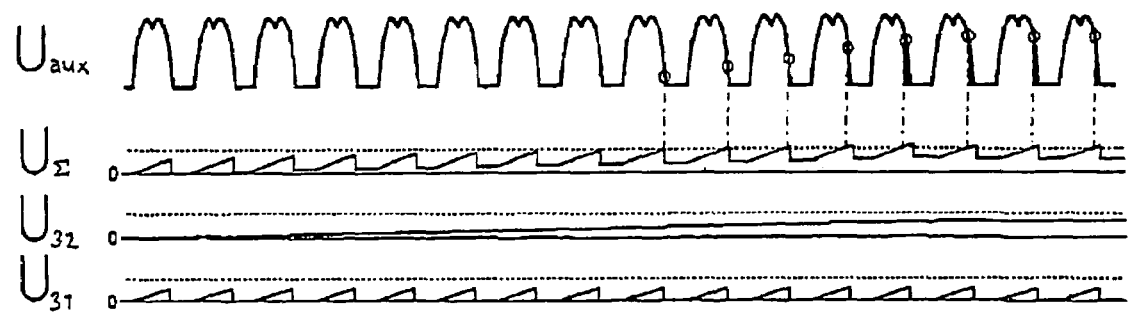
FIG. 4 shows voltages of the charging apparatus of FIG. 3 as a function of time.

FIG. 4 shows, as a function of time, voltage $U_{aux}$ of phase U, sum $U_\Sigma$ of output voltages of integrators 31 and 32, and, separately, output voltage $U_{32}$ of a second integrator 32 and output voltage $U_{31}$ of a first integrator 31. The voltages in FIG. 4 are expressed with respect to the negative busbar DC−. In accordance with FIG. 4, each network cycle of the voltage $U_{aux}$ includes a double-peaked bulge. The sections with zero voltage between the double-peaked bulges substantially consist of periods of time during which the voltage of phase U is lower than the voltages of phases V and W.

When the voltage $U_{93}$ exceeds a triggering level, a trigger circuit 38 supplies a short current pulse to a gate of a charging thyristor $T_{ch}$ via an isolation transformer 39, and the thyristor $T_{ch}$ is ignited if its anode is more positive than the cathode. A slice, so to speak, is clipped off an end part of a network cycle of the voltage supplying an auxiliary voltage source, the current pulse caused by the slice increasing the terminal voltage of the auxiliary intermediate circuit capacitor $C_{aux}$. A charging pulse charging the capacitor $C_{aux}$ passes via the controllable semiconductor switch $T_{ch}$. The current is restricted by the inductive reactance of both the network and input inductor.

As the ignition moment of the charging thyristor $T_{ch}$ advances constantly, the terminal voltage of the capacitor $C_{aux}$ eventually reaches a value at which the restricting circuit 37 stops the increase of the output voltage of the second integrator 32. This means that the advancement of the gate control of the charging thyristor $T_{ch}$ ends, which results in the voltage of the auxiliary intermediate circuit being stabilized to the prevailing value. The triggering moment of the charging thyristor $T_{ch}$ is automatically adjusted to such a point in time which enables a desired intermediate circuit voltage of the auxiliary voltage source to be remained, irrespective of changes in the load.

The restricting circuit 37 may be adjustable such that a value of the capacitor terminal voltage which causes the increase in the output voltage of the second integrator 32 to stop can be changed. Alternatively, the adjustable restricting circuit 37 may be arranged to stop the increase in the voltage of the charging pulses after the voltage of the charging pulses has exceeded a limit which can be changed by adjustment of the restricting circuit. The adjustability of the restricting circuit 37 provides an advantage that enables disturbances occurring in the network to be taken into account case-specifically, and a charging pulse always to be generated from a portion of the network voltage which contains no detrimentally high voltage peaks.

The charging arrangement for capacitor means according to the invention may also be arranged to be supplied by a voltage of a type other than that used in the above-described example. Preferably, the charging arrangement for capacitor means according to the invention is arranged to be supplied by a voltage which comprises clear network cycles such that each network cycle at its end part includes a portion wherein the voltage approaches zero, while a first time-derivative is finite. Slices are then clipped off the end parts of these network cycles in order to generate charging pulses.

In practice, the above-disclosed requirement of finiteness of the first time derivative of voltage has only little significance since all real circuits contain some inductance and/or capacitance. The fact that a charging pulse is preferably generated from a decreasing end part of a network cycle is due to the need to commutate a controllable switch.

In the arrangement of FIG. 3, the voltage acting over the charging thyristor $T_{ch}$ reaches a zero level during each network cycle when the capacitor $C_{aux}$ is being charged. This ensures commutation of the charging thyristor $T_{ch}$. If the charging thyristor $T_{ch}$ were replaced by a gate turn-off charging component, such as a GTO thyristor, no need would exist for the voltage acting over the charging component to reach the zero level in order to turn off the component. The GTO thyristor would also enable the capacitor means to be charged utilizing the increasing portion of a network cycle. However, a GTO thyristor corresponding to a common thyristor is considerably more expensive.

It is obvious to one skilled in the art that the basic idea of the invention can be implemented in many different ways. The invention and its embodiments are thus not restricted to the above-described examples but they may vary within the scope of the claims.

The invention claimed is:

1. A charging arrangement for capacitor means, the arrangement being arranged to be supplied by a voltage containing network cycles, and comprising a gate-controlled semiconductor switch ($T_{ch}$) arranged for charging the capacitor means ($C_{aux}$), and means for generating a control signal of the gate-controlled semiconductor switch, wherein the means for generating the control signal include a clipper, a first integrator, a second integrator, a cycle indicator, a reset device, an adder, a restricting circuit, a trigger circuit, and an isolation transformer, wherein the clipper is arranged to restrict the supplying voltage containing network cycles to be substantially a square wave having a predetermined amplitude, the cycle indicator is arranged to indicate when a network cycle of the supplying voltage ends, the first integrator is arranged to form, from the square wave, a ramp wave whose value is reset by the reset device at the end of each network cycle in order to generate a sawtooth wave voltage signal, whereby information about the ending of each network cycle is obtained from the cycle indicator, the second integrator is arranged to generate, from the square wave, a ramp wave voltage signal whose value increases during each network cycle until the restricting circuit stops the increase in the value of the ramp wave voltage signal when predetermined conditions are fulfilled, the adder is arranged to add up the sawtooth wave voltage signal of the first integrator and the ramp wave voltage signal of the second integrator into a sum signal ($U_\Sigma$), and the trigger circuit is arranged to supply an ignition pulse to a gate of the semiconductor switch ($T_{ch}$) via the isolation transformer when the sum signal ($U_\Sigma$) exceeds a predetermined trigger level.

2. A charging arrangement for capacitor means as claimed in claim 1, wherein a time constant ($T_1$) of the first integrator is substantially smaller than a time constant ($T_2$) of the second integrator.

3. A charging arrangement for capacitor means as claimed in claim 1, wherein the predetermined conditions of the restricting circuit, upon the fulfilment of which the restricting circuit stops an increase in the value of the ramp wave voltage signal generated by the second integrator, contain a limit value of a terminal voltage of the capacitor means ($C_{aux}$) and/or a limit value of the voltage of charging pulses.

4. A charging arrangement for capacitor means as claimed in claim 3, wherein the restricting circuit is adjustable such that the predetermined conditions, upon the fulfilment of which the restricting circuit stops an increase in the value of the ramp wave voltage signal generated by the second integrator, can be changed.

5. A charging arrangement for capacitor means as claimed in claim 1, wherein an input of the clipper and an input of the cycle indicator are coupled to the same potential as an anode of the gate-controlled semiconductor switch ($T_{ch}$), and an input of the restricting circuit is coupled to the same potential as a cathode of the gate-controlled semiconductor switch ($T_{ch}$).

6. A charging arrangement for capacitor means as claimed in claim 1, wherein the supplying voltage containing network cycles is connected between the anode and the cathode of the gate-controlled semiconductor switch ($T_{ch}$), and the capacitor means ($C_{aux}$) are arranged to be coupled to the cathode of the gate-controlled semiconductor switch ($T_{ch}$) such that an increase in the voltage of the capacitor means ($C_{aux}$) directly decreases amplitude of the supplying voltage containing network cycles.

7. A charging arrangement for capacitor means as claimed in claim 2, wherein the predetermined conditions of the restricting circuit, upon the fulfilment of which the restricting circuit stops an increase in the value of the ramp wave voltage signal generated by the second integrator, contain a limit value of a terminal voltage of the capacitor means ($C_{aux}$) and/or a limit value of the voltage of charging pulses.

8. A charging arrangement for capacitor means as claimed in claim 2, wherein an input of the clipper and an input of the cycle indicator are coupled to the same potential as an anode of the gate-controlled semiconductor switch ($T_{ch}$), and an input of the restricting circuit is coupled to the same potential as a cathode of the gate-controlled semiconductor switch ($T_{ch}$).

9. A charging arrangement for capacitor means as claimed in claim 3, wherein an input of the clipper and an input of the cycle indicator are coupled to the same potential as an anode of the gate-controlled semiconductor switch ($T_{ch}$), and an input of the restricting circuit is coupled to the same potential as a cathode of the gate-controlled semiconductor switch ($T_{ch}$).

10. A charging arrangement for capacitor means as claimed in claim 4, wherein an input of the clipper and an input of the cycle indicator are coupled to the same potential as an anode of the gate-controlled semiconductor switch ($T_{ch}$), and an input of the restricting circuit is coupled to the same potential as a cathode of the gate-controlled semiconductor switch ($T_{ch}$).

11. A charging arrangement for capacitor means as claimed in claim 2, wherein the supplying voltage containing network cycles is connected between the anode and the cathode of the gate-controlled semiconductor switch ($T_{ch}$), and the capacitor means ($C_{aux}$) are arranged to be coupled to the cathode of the gate-controlled semiconductor switch ($T_{ch}$) such that an increase in the voltage of the capacitor means ($C_{aux}$) directly decreases amplitude of the supplying voltage containing network cycles.

12. A charging arrangement for capacitor means as claimed in claim 3, wherein the supplying voltage containing network cycles is connected between the anode and the cathode of the gate-controlled semiconductor switch ($T_{ch}$), and the capacitor means ($C_{aux}$) are arranged to be coupled to the cathode of the gate-controlled semiconductor switch ($T_{ch}$) such that an increase in the voltage of the capacitor means ($C_{aux}$) directly decreases amplitude of the supplying voltage containing network cycles.

13. A charging arrangement for capacitor means as claimed in claim 4, wherein the supplying voltage containing network cycles is connected between the anode and the cathode of the gate-controlled semiconductor switch ($T_{ch}$), and the capacitor means ($C_{aux}$) are arranged to be coupled to the cathode of the gate-controlled semiconductor switch ($T_{ch}$) such that an increase in the voltage of the capacitor means ($C_{aux}$) directly decreases amplitude of the supplying voltage containing network cycles.

14. A charging arrangement for capacitor means as claimed in claim 5, wherein the supplying voltage containing network cycles is connected between the anode and the cathode of the gate-controlled semiconductor switch ($T_{ch}$), and the capacitor means ($C_{aux}$) are arranged to be coupled to the cathode of the gate-controlled semiconductor switch ($T_{ch}$) such that an increase in the voltage of the capacitor means ($C_{aux}$) directly decreases amplitude of the supplying voltage containing network cycles.

* * * * *